SIMULTANEOUS READ AND WRITE MEMORY CONFIGURATION

Filed June 21, 1965 5 Sheets-Sheet 1

INVENTORS.
LUTHER W. RICKETTS, JR.,
GEORGE L. BUENGER and
ROBERT J. ERICKSON
BY Lockwood, Woodard, Smith & Weikart
Attorneys

SIMULTANEOUS READ AND WRITE MEMORY CONFIGURATION

INVENTORS.
LUTHER W. RICKETTS, JR.,
GEORGE L. BUENGER and
ROBERT J. ERICKSON
BY Lockwood, Woodard, Smith & Weikart
Attorneys INVENTORS.
LUTHER W. RICKETTS, JR.,
GEORGE L. BUENGER and
ROBERT J. ERICKSON
BY Lockwood, Woodard, Smith & Weikart
Attorneys INVENTORS.
LUTHER W. RICKETTS, JR.,
GEORGE L. BUENGER and
ROBERT J. ERICKSON
BY Lockwood, Woodard, Smith & Weikart
Attorneys

SIMULTANEOUS READ AND WRITE MEMORY CONFIGURATION

Filed June 21, 1965 5 Sheets-Sheet 5

INVENTORS.
LUTHER W. RICKETTS, JR.
GEORGE L. BUENGER and
ROBERT J. ERICKSON
BY Lockwood, Woodard, Smith & Weikart
Attorneys United States Patent Office 3,471,838

Patented Oct. 7, 1969

3,471,838

SIMULTANEOUS READ AND WRITE MEMORY CONFIGURATION

Luther W. Ricketts, Jr., Urbana, George L. Buenger, Champaign, and Robert J. Erickson, St. Joseph, Ill., assignors to The Magnavox Company, Fort Wayne, Ind., a corporation of Delaware Filed June 21, 1965, Ser. No. 465,673

Int. Cl. G11b *5/00*

U.S. Cl. 340—174 7 Claims

ABSTRACT OF THE DISCLOSURE

A memory is provided with first and second planes of cores. A first wire is coupled to the cores of the first plane and to the cores of the second plane so that a single pulse of current in the first wire writes in the cores of the first planes and reads out of the cores of the second plane. A second wire is coupled to the cores of the first plane and to the cores of the second plane so that a single pulse of current in the second wire reads out of the cores of the first plane and writes in the cores of the second plane. Respective inhibit wires are coupled to each core to prevent write in of selected cores, and respective read wires are coupled to each core to read out of selected cores during the occurrence of a pulse of current in either the first wire or the second wire.

This invention relates to memory arrays, and more particularly to a memory configuration enabling a word to be written into one memory address at the same time as a word is read out of another address, with a single drive current pulse effecting both results.

Normally the interval between the reading of two words out of a destructive read out memory is equal to the total time required to read out and rewrite the word into an address. Some efforts have been made to speed up read and write operations, and even to accomplish them simultaneously or almost simultaneously, but core size requirements, noise sensitivity, and close current tolerance requirements, have continued to present problems.

It is therefore a general object of the present invention to provide an improved memory configuration.

A further object is to provide a simultaneous read and write magnetic core memory array making it possible to more efficiently utilize the cores as a function of time.

A further object is to provide an array permitting the use of fewer wires per core, and smaller and faster cores.

A still further object is to provide a simultaneous read and write memory wherein each wire needs only to be threaded through the cores of a row or column of cores a single time.

Described briefly, in the typical embodiment of the present invention, the memory is conveniently divided into two parts, a first memory plane and a second memory plane. The odd numbered addresses are stored in the first plane, while the even numbered addresses are stored in the second plane. The memory is word organized and wired so that the cores in one row of one of the planes can be switched by a single full-write current pulse on one wire threaded therethrough, and the cores in a row of the other plane can simultaneously be switched by the same current pulse on the same wire threaded through the cores of that row. A unidirectional current driver and current switch are connected to the wire to obtain the switching action.

Each core has one such wire therethrough which is pulsed unidirectionally for the write-in operation, and another wire which is pulsed unidirectionally for the read-out operation. Each core also has two additional wires threaded therethrough, one being a digit wire and the other being a sense wire. Each digit wire is connected to a digit driver therefor which is capable of providing a pulse of sufficient strength to prevent the switching of the core by the full write current pulse applied thereto by the addressing driver. Thus the writing into the cores is determined by the condition of the digit drivers connected to the digit wires of the cores during the write current pulse.

During the write current pulse in the one plane, the same pulse is used for reading out an address in the other plane, and the sense wires are employed to read out the information which is then stored in a sense register. A set of addressing current drivers and switches is employed so that the memory addresses are processed sequentially and, as a write current pulse is applied to the row of cores in one plane, the information which was previously in that row of cores before the read current pulse therein, is written back into that row. Control of the inhibiting digit drivers results from the information previously stored from that row in the sense register.

The full nature of the invention will be understood from the accompanying drawings and the following description and claims.

Figure 1:
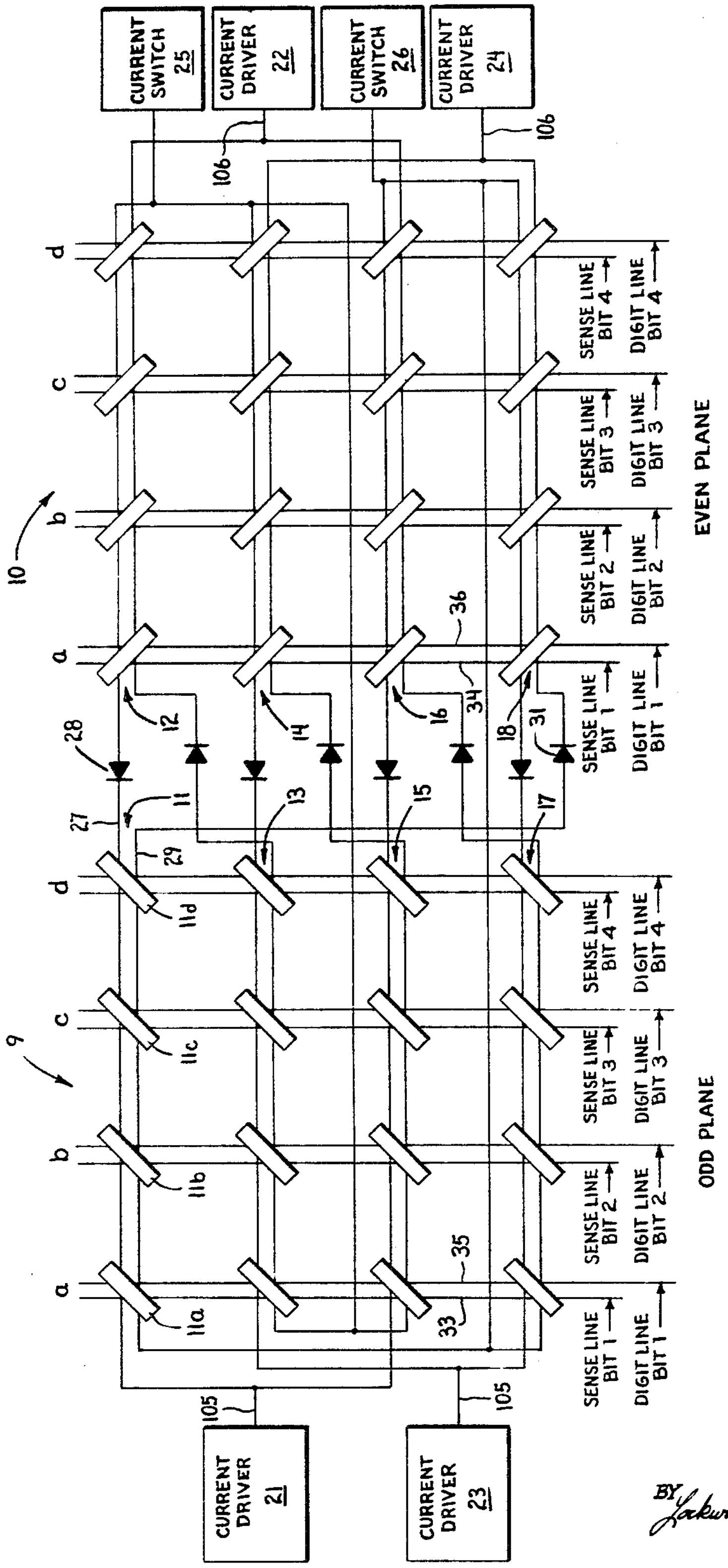
FIG. 1 is a schematic diagram of a two plane simultaneous read and write memory according to a typical embodiment of the present invention.

Referring to the drawings in detail, and particularly FIG. 1, thereof, a four-bit, word-organized, magnetic core memory having eight addresses is divided into memory plane A and memory plane B. For convenience, the odd numbered addresses are stored in plane A (hereafter referred to as the "odd" plane), while the even numbered addresses are stored in plane B (hereafter referred to as the "even" plane). The cores in the odd plane 9 are arranged in four rows 11, 13, 15, and 17. In the even plane 10 the four rows are rows 12, 14, 16, and 18. In each of the planes, the cores are arranged in columns which are identified by the reference characters *a*, *b*, *c*, and *d*. The individual cores in each row may be identified by the combination of the reference characters identifying the row and the column in which the core happens to be, such as core 11*a*, for example.

Four unidirectional current drivers 21, 22, 23, and 24, and two unidirectional current switches 25 and 26 are used to sequentially address the eight, four-bit memory words. The polarity of the current drivers and current switches is such that conventional (positive) current flows out of the current switches and into the current drivers; the flow of electrons is out of the current drivers and into the current switches. The cores of each row have a common write wire connected to one of the addressing current drivers and one of the switches, and the cores of each row have a read wire connected to another addressing current driver and one of the switches. Each core has a sense and a digit wire, and each digit wire is common to the cores in one column and each sense wire is common to the cores in one column. For example, the cores in row 11 have a common write line or wire 27 connected bewteen the current driver 21 and the current switch 25. An isolation diode 28 prevents flow of current in a reverse direction through this wire 27. The isolation diodes in the other write lines eliminate current paths other than through the selected lines for a particular combination of addressing current driver and switch .

Figure 1A:
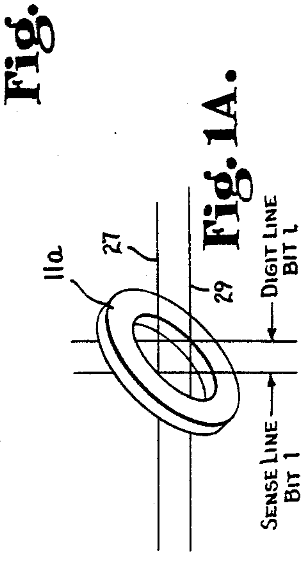
FIG. 1A is an enlarged schematic view of a core of the memory.

As shown in FIG. 1A, illustrating core 11*a*, for example, the lines of FIG. 1 actually pass through the hole in the toroid.

Line 27 passes through the cores in row 11 in such manner that a current pulse in line 27 can induce saturation in these cores of one polarity such that switching can be inhibited by digit driver pulses while at the same time inducing saturation in the cores of row 12 of plane 10 in the opposite polarity such that the switching of a core will generate an output from the sense amplifiers terminating the sense lines. Therefore line 27 is a write pulse line for the cores in row 11 of the odd plane 9 and a read pulse for the cores of row 12 in the even plane 10. The current drivers and switches are capable of providing full current pulses effective to switch the magnetic states of the cores without introduction of any additional switching pulses on other wires.

The read wire 29 for the core in row 11 of the odd plane is connected between the current switch 26 and current driver 24 and employs an isolation diode 31 therein to prevent the flow of current therethrough in a reverse direction. Read line 29 for row 11 of the odd plane is also the write line for row 18 of the even plane.

The cores in column *a* of plane 9 all have a sense line 33 which is common to them. Similarly all of the cores in column *a* of plan 10 have a sense line 34 common to them. All of the cores of column *a* in plane 9 have a digit line 35 common to them and the cores of column *a* of plane 10 have a digit line 36 common to them. The purpose of the digit lines is to inhibit the switching of cores linked by the digit line as desired during the write current in the core being addressed. The digit driver currents are polarized so as to counteract the magnetomotive force of write addressing currents in the write lines. Therefore the digit drivers will be active when a "zero" is to be written into the addressed core. The purpose of the sense lines is, of course, to sense a change of state of the cores in the row being addressed by a read current, for read out of a word in that row.

The usual operation is for the current drivers and switches to be activated in a predetermined order, to sequentially address the eight four-bit words, as indicated above. For example, current switch 25 is activated before a current pulse is generated by addressing current driver 21. Then, with switch 25 activated, drivers 21, 22, 23, and 24 are pulsed in that sequence, one pulse at a time. When current driver 21 is pulsed, the cores in row 11 are written into while the cores of row 12 are read. When current driver 22 is pulsed, writing is done in row 12 and reading is done in row 13. When current driver 23 is pulsed, the writing is in row 13 and the reading is in row 14. When current driver 24 is pulsed, the writing is in row 14 and the reading is in row 15.

After the pulse from driver 24 and before the next current pulse is generated by driver 21, switch 25 is deactivated and switch 26 is activated. Then the next pulse from current driver 21 writes in row 15 and reads in row 16. And the sequence continues until after current driver 24 is pulsed again, whereupon current switch 26 is deactivated and current switch 25 is again reactivated before current driver 21 is again pulsed to start the next addressing cycle. Thus it is seen that the current pulses are routed through both planes so that a read current for the odd plane acts as a write current for the even plane, and a write current for the odd plane acts as a read current for the even plane. During the writing in a row, if the information bit to be written into a core is a "one," the digit line for that core will not be activated. If the bit for that core is to be a zero, the digit line will be activated to prevent the switching of the core. During the writing pulse in one plane, the sense amplifiers sensing the switching of the cores in the other plane will be strobed.

As the addressing occurs, and the rows are addressed in sequence, each address read out of is again written into on the succeeding driver current pulse. For each cycle through the memory, all eight addresses are read out and reloaded.

Figure 2:
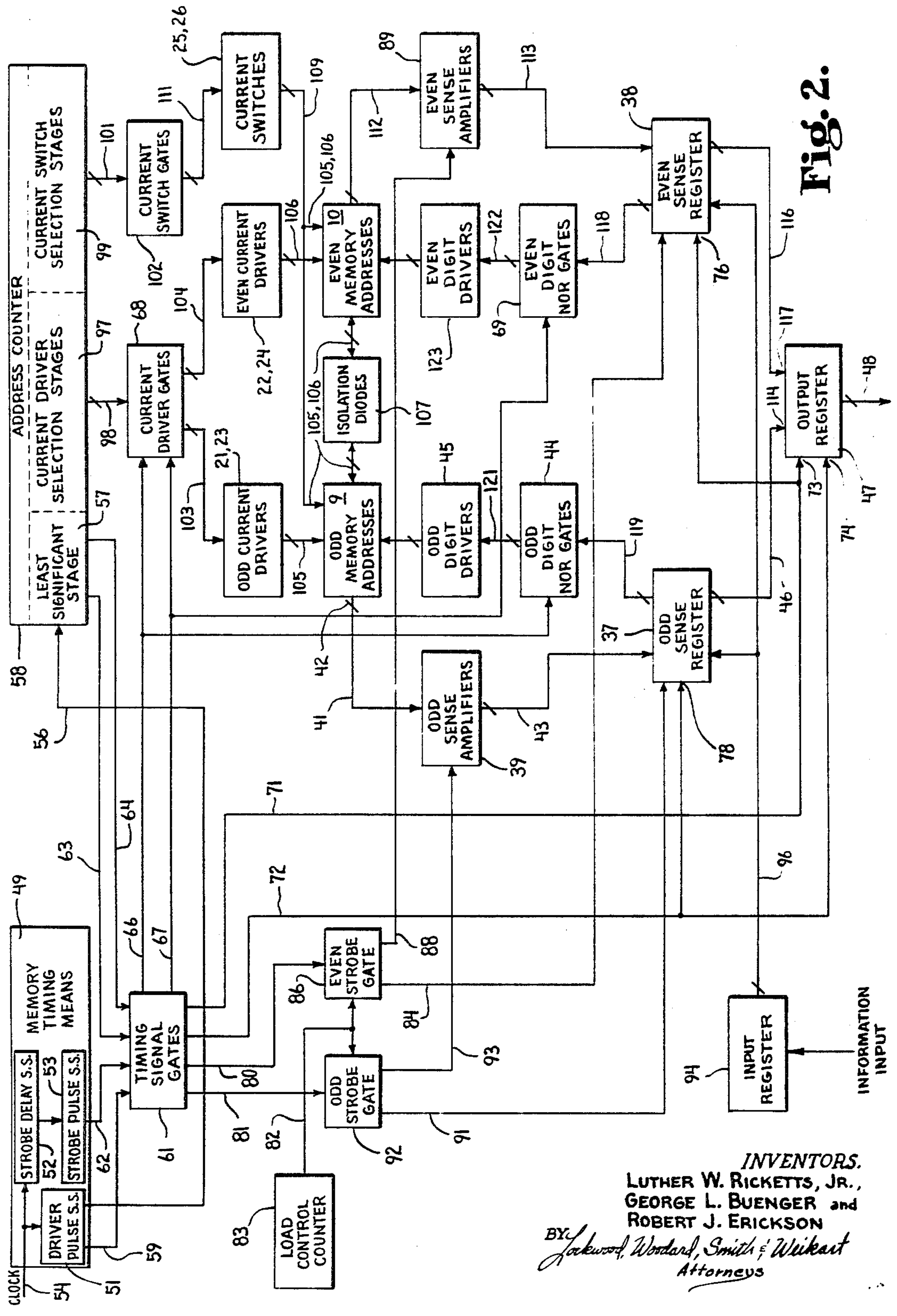
FIG. 2 shows a block diagram for a memory system incorporating a simultaneous read and write memory configuration.

An application of the present invention is illustrated in FIG. 2 where, in order to rewrite a word back into the address from which it was read, two sense registers 37 and 38 are used. For a four-bit word memory such as shown in FIG. 1, each of the sense registers would be a four-bit register. In discussing FIG. 2, the various accessory devices associated with the odd memory plane will be referred to as the "odd" devices and those associated with the even memory plane will be referred to as the "even" devices. Thus the sense register 37 is the odd sense register and sense register 38 is the even sense register. Also, for convenience of illustration in FIG. 2, instead of all of the sense wires from the odd memory plane being shown connected to the odd sense amplifiers 39, a single wire 41 is shown with a slash 42 therethrough to indicate that more than one like wire extends from the odd memory plane to the odd sense amplifiers 39. This same symbolism is used throughout FIG. 2. Thus the outputs from the odd sense amplifier to the odd sense register would be taken on four lines, although only one line 43 is shown. Also in FIG. 2, the arrows on the lines between the blocks indicate the direction of information flow, and do not necessarily indicate the direction of current flow.

Referring further now to FIG. 2, the odd sense register 37 is connected to the odd digit gates 44 which are connected to the odd digit drivers 45. It is understood, of course, that for each column of the odd memory plane, there is a distinct digit driver controlled by a digit gate controlled by one bit in the odd sense register. As mentioned above, in order to rewrite a word back into the address from which it was read, a word read from an odd plane address, for example, is stored in the odd sense register. During the succeeding write current pulse for the odd plane address which has just been read, the contents of the odd sense register, acting through the odd digit gates, either enable or inhibit the generation of digit driver current pulses on the respective digit lines for odd memory plane. Thus the stored word is written back into the address from which it was read.

It has been found convenient in the practice of the present invention to employ a combination of NOR and pulse gate logic. In this logic, the "1" is represented by a positive voltage and a "0" is represented by zero voltage. All NOR gate inputs must be at zero volts in order to generate a positive voltage output. Flip-flops and single shot multivibrators used in the logic incorporate pulse gate inputs where a voltage rise on the pulse input will trigger a change of state if the associated level input to the device is at a "1" state and the flip-flop or single shot is not already in the state in which the trigger pulse input tends to put it. The addressing current drivers and the digit drivers and the current switches are activated by a "1" (positive voltage) input.

As the description proceeds from this point, various other components appearing in the blocks of FIG. 2 will be referred to generally at first, and then certain ones of them will be discussed in more detail.

Figure 3:
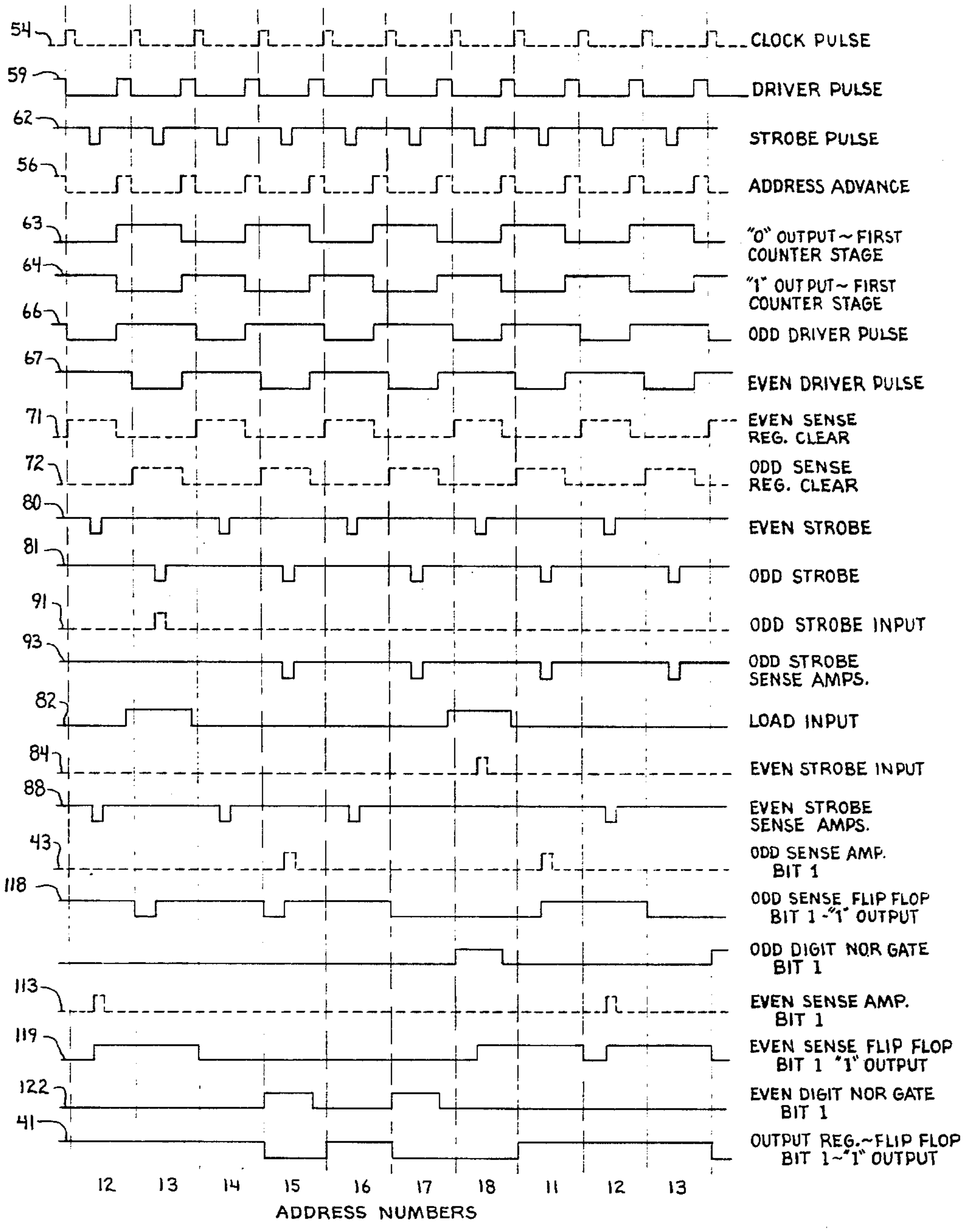
FIG. 3 shows the waveforms of signals on various lines of the block diagram.

In FIG. 3, showing the signal waveforms coinciding with this logic, the signals driving NOR gates or digit driver inputs are shown as a solid line. Signals driving pulse inputs are shown as dashed lines with solid voltage rises.

Referring further to FIG. 2, for each bit in each of the sense registers, there is a flip-flop. Each flip-flop has a first pulse input connected to one of the lines 43 from one of the odd sense amplifiers. It has a first level input fixed at the "1" voltage level. Each flip-flop also has a second pulse input and a second level input, and all of the flip-flops of a register have a common clear pulse input and line. A first output of each of the flip-flops of the odd sense register is connected by one of the lines 46 to the level input of one of the flip-flops of the output register 47 and a second output of each flip-flop of the odd sense register is connected by one of the lines 119 to one of the odd digit NOR gates 44. The output register has four parallel output lines 48.

To cause the various events to take place in the proper sequence, additional components of the system include the memory timing means 49 including a driver pulse single shot 51, a strobe delay single shot 52 and a strobe pulse single shot 53. A clock pulse input 54 is connected to the driver pulse single shot and the strobe delay single shot, and the output of the strobe delay single shot triggers the strobe pulse single shot 53. The output line 56 from the driver pulse single shot is connected to the least significant (first binary) stage 57 of the address counter 58. The driver pulse output line 59 from the driver pulse single shot is connected to timing signal gates 61, and the strobe pulse output of the strobe pulse single shot 53 is connected on the line 62 to timing signal gates in block 61. Complementary outputs on lines 63 and 64 are connected from the first binary stage 57 of the address counter to timing signal gates in the group 61.

Driver pulses from the gates of the group 61 are provided on lines 66 and 67 to current driver gates 68, and the pulses on line 66 are coupled to the odd digit NOR gates 44 and pulses on line 67 are coupled to even digit NOR gates 69. Other timing signals are on output lines 71 and 72, line 71 being connected to a sample input 73 of the output register 47, and line 72 being connected to the sample input 74 of the output register. Line 71 is also connected to the clear line input 76 of the even sense register and the line 72 from the timing signal pulse gates is connected to the clear pulse input 78 of the odd sense register.

Additional outputs from the timing signal gate group are provided on lines 80 and 81 to the even and odd strobe gates respectively. A load signal input line 82 from a load control counter 83 is connected to the even and odd strobe gates. One strobe pulse output line 84 from the even strobe gate 86 is connected to the pulse input line of the even sense register 38. The other strobe pulse output line 88 from the even strobe gate 86 is connected to the even sense amplifiers 89.

The strobe pulse output line 91 from the odd strobe gate 92 is connected to one pulse input line of the odd sense register 37, and the other strobe pulse line 93 from the odd strobe gate is connected to the odd sense amplifiers 39. An input register 94, synchronized with the load control counter 83, is provided with parallel output lines 96 connected to the odd sense register and to the even sense register for the purpose of loading new words into these registers when required.

The current driver selection stages 97 of the address counter 58 have output lines 98 to the current driver gates 68. Current switch selection stages 99 of the address counter have output lines 101 to the current switch gates 102. Driver pulse output lines 103 from the current driver gates are applied to the odd current drivers 21 and 23 and driver pulse output lines 104 from the current driver gates are applied to the even current drivers 22 and 24. Lines 105 from the odd current drivers to the odd memory plane include the write lines of the odd plane in FIG. 1 which are connected to the current drivers 21 and 23. Likewise the event current driver output lines designated 106 in FIG. 2 represent the write lines of the even plane in FIG. 1 which are connected to the current drivers 22 and 24. The isolation diodes 107 of FIG. 2 are shown in FIG. 1, two of which bear the reference numerals 28 and 31. As in FIG. 1, lines 105 and 106 pass through both planes and the isolation diodes to the current switches 25 and 26.

The current switch gates 102 are connected by lines 111 to the crurent switches 25 and 26.

Just as the sense wires or lines 41 from the odd memory plane are connected to the odd sense amplifiers 39, the sense lines 112 from the even memory plane are connected to the even sense amplifiers 89. The even sense amplifier output lines 113 are connected to pulse inputs of the flip-flops of the even sense register, the corresponding level inputs for these flip-flops being fixed at a "1" voltage level.

Just as the output lines 46 from the odd sense register are connected to the level inputs 114 of the output register, the output lines 116 of the even sense register 38 are connected to the level inputs 117 of the output register.

Odd sense register output lines 119 are connected to the odd digit NOR gates 44 and even sense register output lines 118 are connected to the even digit NOR gates 69. Odd digit NOR gate outputs on lines 121 are connected to the odd digit drivers 45 and even digit NOR gate outputs on lines 122 are connected to the even digit drivers 123.

To better understand the operation of the logic employed in the illustrated embodiment, reference may be made to the waveform shown in FIG. 3 which shows typical wave shapes of various signals. Again it should be remembered that a binary zero is represented by zero voltage and a binary "1" is represented by a positive voltage. Each of the waveforms in FIG. 3 is given the reference numeral corresponding to the line on which it is found and is also labeled for convenient reference.

It should be noted that the pulse or signal output waveforms shown for the odd sense amplifier, odd sense flip-flop, odd digit NOR gate, even sense amplifier, even sense flip-flop, even digit NOR gate and output register flip-flop are for a single bit only of the corresponding memory addresses, and correspond to an arbitrary but particular information content of the cores being read.

The clock signal driving line 54 triggers the driver pulse single shot 51 and the strobe delay single shot 52. The trailing edge of the strobe delay single shot signal triggers the strobe pulse single shot to provide the strobe pulse on line 62. The trailing edge of the driver pulse on line 56 toggles the first binary stage 57 of the address counter 58. Complementary output signals from the first stage of the address counter on lines 63 and 64 control the gating of the strobe, driver, and sense register clear pulses to the required circuits for a particular count.

Negative driver pulses occurring alternately on lines 66 and 67 are gated with the current driver selection stage outputs of the address counter on lines 98 by the current driver gates 68. The driver gate outputs on lines 103 and 104 drive the current driver inputs, and the current switch gates 102 decode the outputs on lines 101 from the current switch selection stages 99 of the address counter. These stages 99 are the most significant stages of the counter whereas the driver pulse single shot signals were applied to the least significant stage. The switch gate outputs on lines 111 drive the current switch inputs. The current driver outputs on lines 105 and 106 provide the addressing current pulses which pass through a single even address and a single odd address to current switch input lines 109. As described above with reference to FIG. 1, a single wire between a current driver and a current switch passes through one even address and one odd address, with an isolation diode in the wire passing through these addresses.

At the same time that a negative pulse from a timing signal gate on line 66 results in an odd current driver current pulse, the pulse on line 66 also enables the NOR gates 44 to take the inputs from the odd sense register flip-flops 37 for driving the inputs of the odd digit drivers 45. Therefore the odd digit drivers drive the odd digit lines for writing in a word from the odd sense register into the address determined by which of the current drivers and which of the current switches is activated. Then, when the address counter activates the next current driver, which will be an even current driver, a negative pulse on line 67 generates an even current driver pulse. Because the negative pulse on line 67 is also connected to the even digit NOR gates, it also enables the generation of digit pulses on the even digit gate output lines 122 to provide digit driver pulses on the digit lines of the even memory plane for writing in a word from the even sense register 38.

The signals on lines 71 and 72 are the complements of the signals on lines 66 and 67, respectively. They are shown as dashed lines as mentioned above because they are used to drive pulse inputs whereas the signals shown as a solid line in FIG. 3 are signals driving NOR gates for digit driver inputs. The signals on lines 71 and 72 are applied to one of the sense registers, that on line 71 being applied to the clear pulse input 76 of the even sense register 38, and that on line 72 being applied to the clear pulse input of odd sense register 37. The signal on line 71 is also connected to the shift input 73 of the output register to shift the contents of the odd sense register on lines 46 into the output register at the same time that the even sense register is being cleared. Similarly the signal on line 72 is connected to the shift line input 74 of the output register to shift the contents of the even sense register on lines 116 into the output register when the odd sense register is being cleared. In this way, the signals which clear one sense register shift the contents of the other register into the output register.

At this point, it may be helpful to discuss in a little more detail, some of the components appearing in FIG. 2.

Address counter 58

The address counter 58 may be a conventional binary counter composed of a cascade of binary flip-flops arranged such that the binary number represented by the state of the flip-flops is increased by one each time a rise occurs in the wave form present on line 56. One result of this arrangement is that the least significant stage 57 of the address counter 58 makes a transition from one of its two states to the other for every such rise.

In order to use nominal speed flip-flops without requiring excessive time to change addresses, a fast carry counter, rather than a ripple through counter, was used with the simultaneous read and write memory configuration. Any counter configuration which does not require excessive time for advancing the count could be used.

The address counter of FIG. 2 has a toggling input stage. Outputs of this least significant stage 57 drive inputs to timing signal gates and thereby determines whether a strobe pulse or a driver pulse acts upon even or odd circuits.

Counter stages immediately following the least significant stage 57 are used to select a current driver by means of the current driver gates 68. Each time these stages complete a cycle of states, all drivers have been enabled and pulsed.

The most significant stages of the counter 99 are used to select a current switch by means of the current switch gates 102. These current switch selection stages change state each cycle of the current driver selection stages.

Current driver gates 68 and current switch gates 102

In general, blocks 68 and 102 of FIG. 2 will each consist of a matrix of gates which will be activated in the desired sequence. The number and arrangement of gates will be as required by the length of the memory. In FIG. 2, the current drivers and current switches are labeled by the reference numbers 21, 22, 23, 24, 25 and 26, which are the same numbers used to identify the corresponding blocks of FIG. 1. Where the memory configuration of the present invention is used in memories of greater length than that shown in FIG. 1, additional current drivers and switches would be included in the blocks of FIG. 2.

Regardless of the length of the memory, the gates are arranged so that the drivers and switches are activated in a predetermined order. One such possible order is that in which during the activation of any single switch, all drivers are sequentially activated. Following this, that switch is turned off and the next switch is turned on and all drivers are once more sequentially activated. This continues until all possible combinations of switches and drivers have been used once and only once, at which time the entire process is repeated. The number of such combinations is equal to the number of memory addresses and is also equal to the modulus of the address counter. Each state of the address counter corresponds to one such combination and the sequential states of the address counter causes the combinations to occur in the desired sequence. For example, if there are 32 addresses, there may be 32 drivers and 1 switch or there may be 16 drivers and 2 switches, or 8 drivers and 4 switches, such that the product of the number of drivers and the number of switches is equal to the number of addresses. If it is desired to activate a single switch while all drivers are sequenced through, then to activate the second switch while all drivers are sequenced through, etc., and if there are M memory addresses, N drivers, and $(M/N)$ switches, then the relationship between address counter states and driver activation is such that every Nth counter state activates the first drive, beginning with the first state, every Nth counter state activates the second driver, beginning with the second state, etc., while the first current switch is activated by the first N counter states, the second current switch is activated by the second N counter states, etc. This action may be accomplished by any gate matrix which, when its inputs are driven by the counter has a separate output for each driver or switch such that those outputs are activated in the desired sequence.

Figure 4:
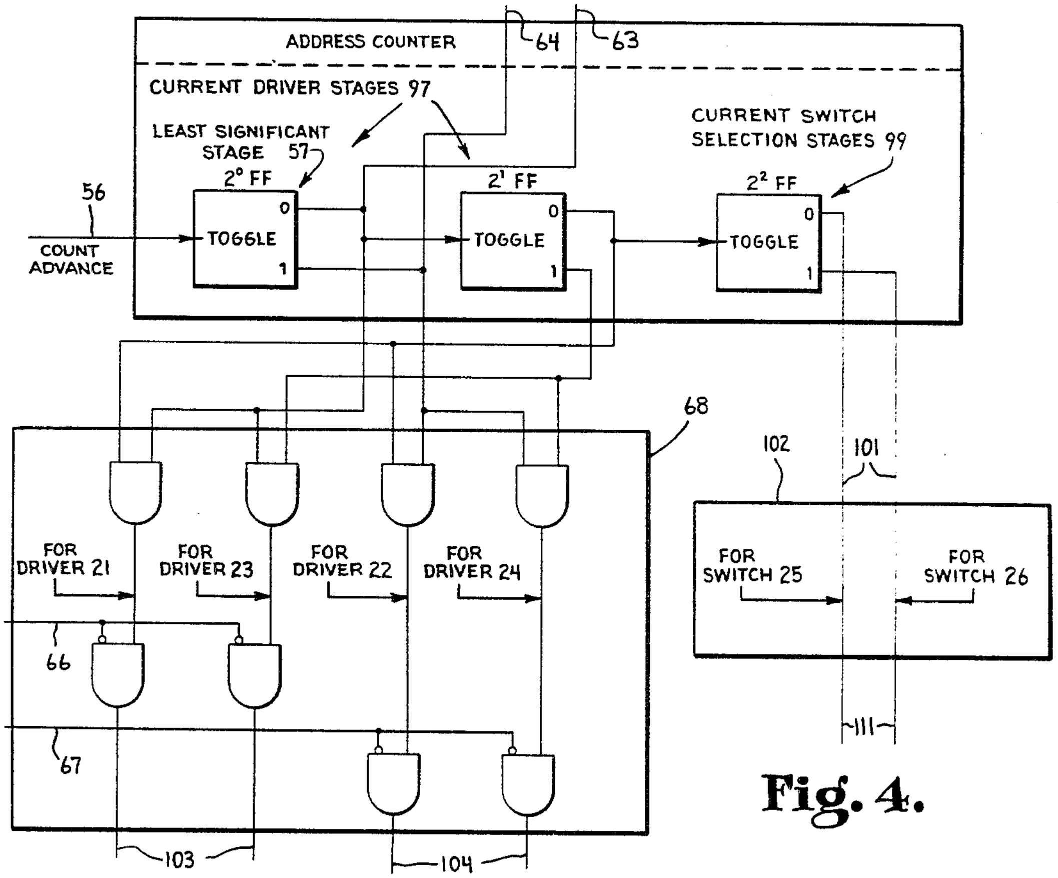
FIG. 4 is a logic diagram of an address counter and decoding gate combination which may be used with an eight address memory.

Applying the foregoing to the 8-address memory of FIG. 1, the number of addresses, M, equals 8. The number of drivers, N, equals 4. The number of switches, $(M/N)$, equals two. The address counter 58 may be the usual three stage binary counter of FIG. 4. The three stages of the counter sequence through the usual eight states. During the first four states, all four drivers are sequenced through while the first switch is on. Then the first switch is turned off, the second switch is turned on, and all four drivers are once more sequenced through. This completes one pass through the entire memory. It can be seen that the conditions to activate the first switch and the second switch are, respectively, the complement of, and the actual output of the third counter stage. Thus, for this particular example, no decoding gates are required for the current switches. This would not be the case for a generalized memory having more addresses. The driver decoding is quite simple, being, in effect, a single "AND" gate for each driver. Following this decoding, an additional ANDing operation is applied to the driver enable lines for lines coming from the timing block. This operation merely shortens the driver pulses and does not affect the sequencing order. Numbers are applied to the elements of FIG. 4 which refer exactly to the same numbers as those of FIG. 2. Thus it can be seen that the contents of blocks 68 and 102 will depend on the memory length.

The AND function of the current driver gates 68 of FIG. 2 can be obtained using NOR gates which drive current driver inputs. Each gate has inputs from the current driver selection stages of the address counter. For each state of the current driver selection stages of the counter, one odd and one even current driver gate will have all "0" inputs from the counter. When a "0" pulse occurs on the odd driver pulse line 66, the odd current driver gate with all "0" inputs from the counter generates a "1" pulse output. The "1" pulse output in turn generates a current pulse output from the selected odd current driver. When a "0" pulse occurs on the even driver pulse line 67, the selected even current driver gate and current driver will be activated. One odd and one even current driver pulse occurs for each state of current driver selection stages of the counter.

Similarly, the current switch gates 102 may be a group of NOR gates driven by signals on lines 101 of the current switch selection stages of the address counter. The outputs of these gates on lines 111 drive current switch inputs. For each state of the current switch selection stages of the address counter, only a single gate will have all "0" inputs and only a single current switch will have a "1" input and conduct a current pulse.

Current driver

The current driver generates a fixed current output when a "1" is present at the circuit input. The current output of a current driver is used to address rows of cores and has a magnitude sufficient to switch the addressed cores.

Current switches

The current switch with a "1" input acts as a voltage source for current pulses generated by current drivers. While a switch activated by a "1" input provides a path for current flow through a selected addressing line, a switch with a "0" input prevents current flow through lines not selected.

Sense amplifier

The sense amplifier is used to amplify voltage signals generated on a sense line by the switching of a core on that line by a read addressing current pulse. A strobe input to the sense amplifiers provide for the strobing of sense line signals. The strobing of the sense signals prevents the generation of false "1" signals due to noise on a sense line. Sense amplifier output signals, generated by the switching of a core on the sense line by a read current pulse, set sense register flip-flops.

Digit driver

The digit driver generates a fixed current output when a "1" is present at the circuit input. The current output of a digit driver is used to inhibit the switching of a core by addressing current driver pulses. The magnitude of digit driver current pulses should be sufficient to inhibit the switching of the addressed core by a write current pulse and yet small enough to prevent any serious disturbance of other cores on the digit line.

Sense register

Each sense register, having as many flip-flop stages as there are bits in a memory word, is used to temporarily store a word read from the memory until it can be rewritten back into the memory and while the word is processed by output circuits. All the flip-flops of a sense register are cleared prior to the reading of a memory word. As a word is read from the memory, sense amplifiers sensing the reading of a "1" from the memory will set flip-flops. When the word read is rewritten back into the memory a "1" output from the set output of a flip-flop prevents a digit driver pulse for that particular bit from being generated and thereby permits the rewriting of a "1." Sense register outputs on lines 46 and lines 116 drive level (enabling) inputs 114 and 117 of the output register such that a change to the "1" state of the signal on line 71 shifts the contents of the odd sense register into the output register and clears the even sense register. A change to the "1" state of the signal on line 72 shifts the contents of the even sense register into the output register and clears the odd sense register.

Figure 5:
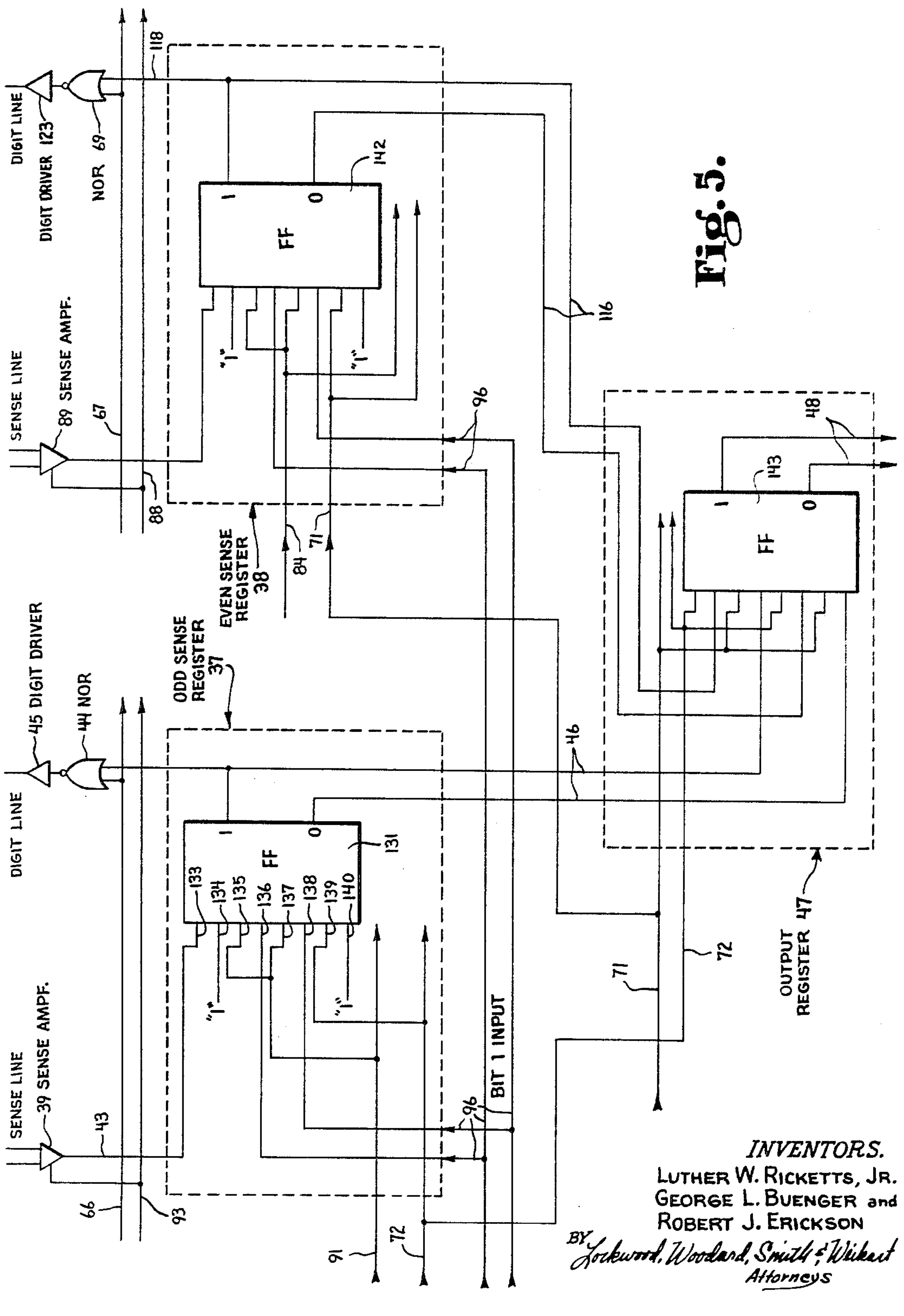
FIG. 5 is an enlarged logic diagram showing the sense amplifier, digit NOR gate, digit driver, sense register flip-flop and output register flip-flop for a single memory word bit of the even and odd memory plane.

These events may be more readily appreciated upon reference to FIG. 5 wherein the first stage in the odd sense register, in the even sense register, and in the output register are shown, as well as the sense amplifier, digit driver, and NOR gate associated with the particular sense register stage shown. A register flip-flop is represented by the symbols containing "FF," and the flip-flop is said to be in a set state when the output designated with the numeral 1 is at a logic "1" and the output designated by the numeral 0 is at a logic "0." The flip-flop is said to be in a cleared or reset state when the 1 output is at a logic "0" and the 0 output is at a logic "1."

These flip-flops are set and cleared by means of pulse gate inputs. The pulse inputs are distinguished from the level inputs by a notch in the pulse line just prior to entering the left-hand side of the flip-flop. For flip-flop 131, for example the input 133 is a pulse input and the input 134 is a level or enabling input. If a logic "1" signal is applied to the level input 134, as indicated in FIG. 5, and a change from the "0" to the "1" state occurs for the input signal applied to the pulse input 133, the flip-flop is driven to a set state and a logic "1" appears at the 1 output terminal while a logic "0" appears at the 0 output terminal. The level input 136 and pulse gate input 135 can also be used together to set the flip-flop. Therefore the inputs 133, 134, 135, and 136 are referred to as the set pulse gate inputs.

The inputs 137, 138, 139 and 140 function in the same way as the set pulse inputs, but are effective to clear the flip-flop rather than set it. They are referred to as the clear pulse gate inputs. Whether the application of a logic "1" signal to a pulse gate input results in changing the state of the flip-flop depends upon whether the level input associated with that pulse input is a logic "1" or logic "0."

The flip-flops 142 and 143 in the other two registers, as well as the other flip-flops (not shown) in all three registers, operate in the same way.

Output register

The output register, having as many stages as there are bits in each memory word, rather than a network of gates, is used to combine the outputs from the two sense registers to form a signal output for each memory word bit. These single output signals are generated by alternately shifting words from the two sense registers into the output register.

The set output of each sense register flip-flop drives a set level input to the associated output register flip-flop and each clear output of a sense register flip-flop drives a clear level input to the associate output register flip-flop. Line 71 drives the pulse input to both set and clear pulse gates enabled by odd sense register flip-flops and line 72 drives the pulse inputs to both set and clear pulse gates enabled by even flip-flops. This means that a change to the "1" state of a signal on line 71 will load the contents of the odd sense register into the output register and a change to the "1" state of the signal on line 72 will load the contents of the even sense register into the output register. Signals on lines 71 and 72 are 180° out of phase and are synchronized with the reading of memory words such that words from odd and even addresses are alternately present at output register outputs.

Memory timing means 49

In FIG. 2, the single shots shown in block 49, along with the gates of block 61, and the least significant stage of the address counter, illustrate a straight forward means of generating timing signals that can be used to operate a simultaneous read and write memory. Generation of timing signals by means of a fast clock and timing counter, or other means applicable to most any memory could be used.

Memory timing gates 61

Figure 6B:
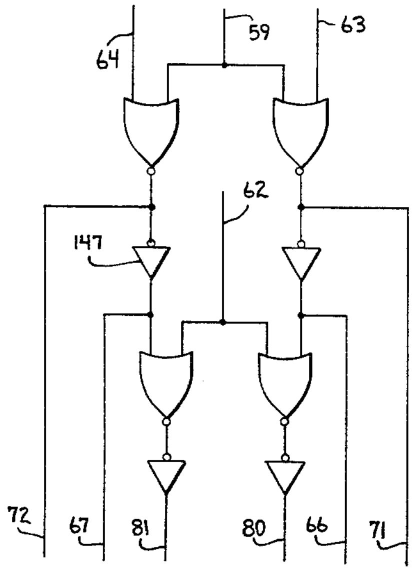
FIGS. 6A and 6B are logic diagrams of gate arrangements, either of which can be used for block 61 of FIG. 2.
Figure 6A:
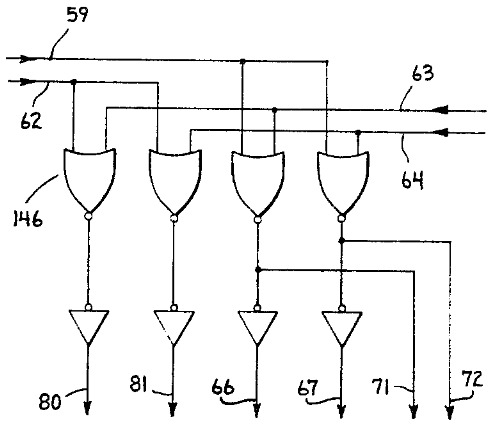

FIGS. 6A and 6B show two two different arrangements of timing signal gates which could be provided in the group 61 of FIG. 2. In each of these two figures, the various NOR gates are represented by the symbol representing NOR gate 146. Inverters are represented by the symbol used for the inverter 147. For each of the NOR gates of both figures, a logic "1" output is derived therefrom only when a logic "0" is provided at each of the two inputs thereof. If a logic "1" appears at any input, the output is a logic "0." The inverter, where used, produces at its output, the logic condition opposite that which is applied to its input.

The NOR gates of block 61 are used to gate strobe pulses and driver pulses to even and odd strobe pulse, driver pulse, and sense register clear pulse lines on alternate address counts. Driver pulses and sense register clear pulses are simply the inverse of one another.

Strobe gates 82 and 92

Two groups of strobe gates direct the even and odd strobe signals to the respective groups of sense amplifiers when the load signal on line 82 is in a normal don't load state. When the signal on line 82 goes to a load state, the strobe signals to sense amplifiers are shut off and instead a "1" pulse on line 91 or line 84 is applied to the pulse inputs of sense register flip-flops with gate enable inputs driven by input signals.

Load control counter 83

In the time compressor application illustrated in FIGURE 2, a load signal on line 82 is generated by means of a load control counter. The load control counter is advanced once each clock pulse and has a module equal to some multiple of the total number of memory addresses (N) plus 1. This means that if address N is loaded by a pulse on line 82, the address $(N+1)$ will be loaded by the next pulse. The load control counter places new words into memory addresses in the order in which they are received.

In addition to providing a load signal for the loading of memory addresses the load control counter can also provide a shift signal for the serial loading of an input register 94 between address loadings.

Depending on the particular application, load signals may be generated by comparing memory addresses with a load address held in a register or counter.

Input register

When the input to the memory is a serial signal, as is the case with a time compressor, input register 94 provides a means of storing bits until enough bits for a memory word are received. After a word is received, the input register may provide temporary storage until the address to be loaded is processed.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A magnetic memory system comprising:
a plurality of magnetic cores arranged in columns and rows; a plurality of row addressing wires, each wire being threaded through the cores of one row in one way and through the cores of another row in the opposite way whereby a unidirectional current flowing in the wire is able to establish a magnetic field in the cores of said one row in one direction and a magnetic field in the cores of the other row in the opposite direction, each addressing wire having a unidirectional device therein to permit current flow therethrough in only one direction;
driver means connected to each addressing wire and capable of producing a current in each addressing wire sufficient to drive into saturation the cores through which the wire passes;
a plurality of digit wires and sense wires, one of said digit wires and one of said sense wires being threaded through each core;
means coupled to said digit wires and sense wires to activate the digit wires of one row while simultaneously gating out signals derived from sense wires of the other row, and to activate the digit wires of the other row while simultaneously gating out signals derived from the sense wires of the one row, whereby current in the row addressing wire is effective to simultaneously write information into said one row and read it out of the other.

2. The memory system of claim 1 and further comprising:
a first sense register having inputs coupled to the sense wires of said one row and operable to receive and store information from the cores of said one row, said first sense register having outputs coupled to the digit wires of said one row to enable reloading the said information back into the cores of said one row.

3. The memory system of claim 2 and further comprising:
a second sense register having inputs coupled to the sense wires of said another row and operable to receive and store information from the cores of said another row, said second sense register having outputs coupled to the digit wires of said another row to enable reloading the information derived from said another row back into the core of said another row.

4. A simultaneous read and write magnetic core memory comprising:
a first memory plane having a plurality of rows of magnetic cores, said cores being arranged in columns;
a second memory plane including a plurality of rows of magnetic cores, said cores of said second plane being arranged in columns;
a first wire threaded through the first row of cores in said first plane and through the first row of cores in said second plane;
a second wire threaded through the second row of cores of said first plane and the first row of cores of said second plane;
a unidirectional device in each of said wires;
the threading of each wire through cores of one plane being in a sense opposite the threading of the wire through cores in the other plane to enable a current produced in each wire to simultaneously produce one switched condition of the cores in one plane and an opposite switched condition of the cores in the other plane.

5. A simultaneous read and write magnetic core memory comprising:
a first memory plane having a plurality of rows of magnetic cores, said cores being arranged in columns;
a second memory plane including a plurality of rows of magnetic cores, said cores of said second plane being arranged in columns;
a first current driver connected through a first wire to a first current switch, said first wire being threaded through the first row of cores in said first plane and through the first row of cores in said second plane, said wire including a first unidirectional device therein to permit flow of positive current only from said first current switch to said first current driver;
a second current driver connected through a second wire to said first current switch, said second wire being threaded through the second row of cores of said first plane and the first row of cores of said second plane;
a second unidirectional device in said second wire permitting flow of positive current therein only from said first current switch to said second current driver;
a third current driver connected through a third wire to said first current switch, said third wire extending through a second row of cores of said first plane and the second row of cores of said second plane;
a third unidirectional device in said third wire permitting the flow of positive current therein only from said first current switch to said third current driver;
a fourth current driver connected through a fourth wire to said first current switch, said fourth wire being threaded through the cores of the third row of said first plane and the cores of said second row of said second plane;

a fourth unidirectional device in said fourth wire permitting the flow of positive current therein only from said first current switch to said fourth current driver;

a second current switch;

a fifth wire connected between said first driver and said second switch, said fifth wire being threaded through cores in the third row of said first plane and through the cores in the third row of said second plane;

a fifth unidirectional device in said fifth wire permitting flow of positive current therein only from said second current switch to said first current driver;

a sixth wire connecting said second current switch to said second current driver, said sixth wire being threaded through the fourth row of cores of said first plane and the third row of cores of said second plane;

a sixth unidirectional device in said sixth wire and permitting flow of positive current therein only from said second current switch to said second current driver;

a seventh wire connecting said second current switch to said third current driver, said seventh wire being threaded through a fourth row of cores of said first plane and a fourth row of cores of said second plane;

a seventh unidirectional device in said seventh wire oriented to permit flow of positive current therein only from said second current switch to said third current driver;

an eighth wire connecting said second current switch to said fourth current driver, said eighth wire being threaded through the cores in the first row of said first plane and through the cores of the fourth row of said second plane;

an eighth unidirectional device in said eighth wire and oriented to permit flow of positive current therein only from said second current switch to said fourth current driver;

timing means coupled to said current drivers and to said current switches and operable to sequentially activate said current drivers during activation of said first current switch and then sequentially activate said current drivers during activation of said second current switch, for addressing a row of cores in said first plane and simultaneously addressing a row of cores of said second plane during activation of each of said current drivers, the threading of each wire through cores of one plane being in a sense opposite the threading of the wire through the cores in the other plane to enable the current produced in each wire to simultaneously produce one switched condition of the cores in one plane and an opposite switched condition of the cores in the other plane.

6. The combination as set forth in claim 5 and further comprising:

a first sense register for said first plane and a second sense register for said second plane, the sense register of said first plane having means coupling each storage unit thereof to a sense wire extending through the cores in a column of said first plane, and the sense register for said second plane having means coupling each storage unit thereof to a sense wire extending through the cores in a column of said second plane;

means coupling each unit of said first sense register to a digit line extending through the cores of a column of said first plane, and means coupling each unit of said second sense register to a digit line extending through the cores in a column of said second plane, said timing means being coupled to said registers to read information out of the cores in a row of a plane to the register for that plane during operation of one of said drivers and then write into the cores of said row the said information during the activation of the next subsequent current driver, whereby the information read out of a row during activation of one current driver is written back into said row during activation of the next current driver in sequence.

7. The combination as set fourth in claim 6 wherein:

each of said cores is a toroid and each of said wires threaded through a core is threaded directly through the hole in the toroid a single time only and each of said wires extending through a core extends through the hole in the toroid a single time only.

References Cited

UNITED STATES PATENTS

| | | | |
|---|---|---|---|
| Re. 25,660 | 10/1964 | Modlinski | 340—174 |
| 3,054,988 | 9/1962 | Edwards et al. | |
| 3,050,716 | 8/1962 | Andrews | 340—174 |
| 3,068,452 | 12/1962 | Sarrafian | 340—147 |
| 3,251,044 | 5/1966 | Robinson et al. | 340—174 |
| 3,339,186 | 8/1967 | Cohen | 340—174 |

STANLEY M. URYNOWICZ, Jr., Primary Examiner